United States Patent
Bhatt et al.

(10) Patent No.: US 12,456,185 B2
(45) Date of Patent: *Oct. 28, 2025

(54) AUTOMATED MACHINE VISION-BASED DEFECT DETECTION

(71) Applicant: QEEXO, CO., San Jose, CA (US)

(72) Inventors: Rajen Bhatt, McDonald, PA (US);
Shitong Mao, Pittsburgh, PA (US);
Raviprakash Kandury, Cupertino, CA (US); Michelle Tai, Fremont, CA (US);
Geoffrey Newman, Pittsburgh, PA (US)

(73) Assignee: Qeexo, Co., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,909

(22) Filed: Nov. 16, 2023

(65) Prior Publication Data

US 2025/0117917 A1 Apr. 10, 2025

Related U.S. Application Data

(63) Continuation of application No. 18/064,040, filed on Dec. 9, 2022, now Pat. No. 11,847,775, which is a
(Continued)

(51) Int. Cl.
*G06T 7/00* (2017.01)
*G06N 3/08* (2023.01)
(Continued)

(52) U.S. Cl.
CPC .............. *G06T 7/0004* (2013.01); *G06N 3/08* (2013.01); *G06T 7/11* (2017.01); *G06T 7/194* (2017.01);
(Continued)

(58) Field of Classification Search
CPC ...... G06N 3/0454; G06N 3/0481; G06N 3/08; G06T 2207/20076; G06T 2207/20081;
(Continued)

(56) References Cited

U.S. PATENT DOCUMENTS

| 10,346,969 B1 | 7/2019 | Raghu et al. |
| 10,410,084 B2 * | 9/2019 | Huang ................ G06T 7/0002 |

(Continued)

FOREIGN PATENT DOCUMENTS

CN 107481231 A 12/2017

OTHER PUBLICATIONS

Chinese Office Action issued Aug. 29, 2025 in corresponding Chinese Patent Application No. 202080089918.1, 16 pages.

*Primary Examiner* — Bobbak Safaipour
(74) *Attorney, Agent, or Firm* — XSENSUS LLP

(57) ABSTRACT

Provided are various mechanisms and processes for automatic computer vision-based defect detection using a neural network. A system is configured for receiving historical datasets that include training images corresponding to one or more known defects. Each training image is converted into a corresponding matrix representation for training the neural network to adjust weighted parameters based on the known defects. Once sufficiently trained, a test image of an object that is not part of the historical dataset is obtained. Portions of the test image are extracted as input patches for input into the neural network as respective matrix representations. A probability score indicating the likelihood that the input patch includes a defect is automatically generated for each input patch using the weighted parameters. An overall defect score for the test image is then generated based on the probability scores to indicate the condition of the object.

20 Claims, 12 Drawing Sheets

Related U.S. Application Data continuation of application No. 17/110,131, filed on Dec. 2, 2020, now Pat. No. 11,538,146.

(60) Provisional application No. 62/950,440, filed on Dec. 19, 2019.

(51) Int. Cl.
  *G06T 7/11*  (2017.01)
  *G06T 7/194*  (2017.01)

(52) U.S. Cl.
  CPC .............. *G06T 2207/20076* (2013.01); *G06T 2207/20081* (2013.01); *G06T 2207/20084* (2013.01); *G06T 2207/30164* (2013.01)

(58) Field of Classification Search
  CPC . G06T 2207/20084; G06T 2207/30164; G06T 7/0004; G06T 7/0008; G06T 7/11; G06T 7/194
  See application file for complete search history.

(56) References Cited

U.S. PATENT DOCUMENTS

| | | | |
|---|---|---|---|
| 10,417,524 B2* | 9/2019 | Feng | G06F 18/2155 |
| 10,467,502 B2* | 11/2019 | Ren | G06T 7/0004 |
| 10,504,220 B2* | 12/2019 | Lim | G06T 7/0008 |
| 11,144,889 B2* | 10/2021 | Li | G06T 7/001 |
| 11,538,146 B2* | 12/2022 | Bhatt | G06T 7/194 |
| 11,847,775 B2* | 12/2023 | Bhatt | G06T 7/0004 |
| 2018/0322623 A1* | 11/2018 | Memo | G06N 3/084 |
| 2019/0206056 A1* | 7/2019 | Georgescu | G06T 7/0014 |
| 2019/0368133 A1* | 12/2019 | Joshi | G06T 7/11 |
| 2020/0364842 A1* | 11/2020 | Chaton | G06N 3/04 |
| 2021/0174482 A1* | 6/2021 | Ji | G06N 5/046 |
| 2021/0374453 A1* | 12/2021 | Kuo | G06V 10/7715 |
| 2022/0084660 A1* | 3/2022 | Georgescu | G16H 30/20 |
| 2022/0092765 A1* | 3/2022 | Song | G06T 7/0004 |

* cited by examiner

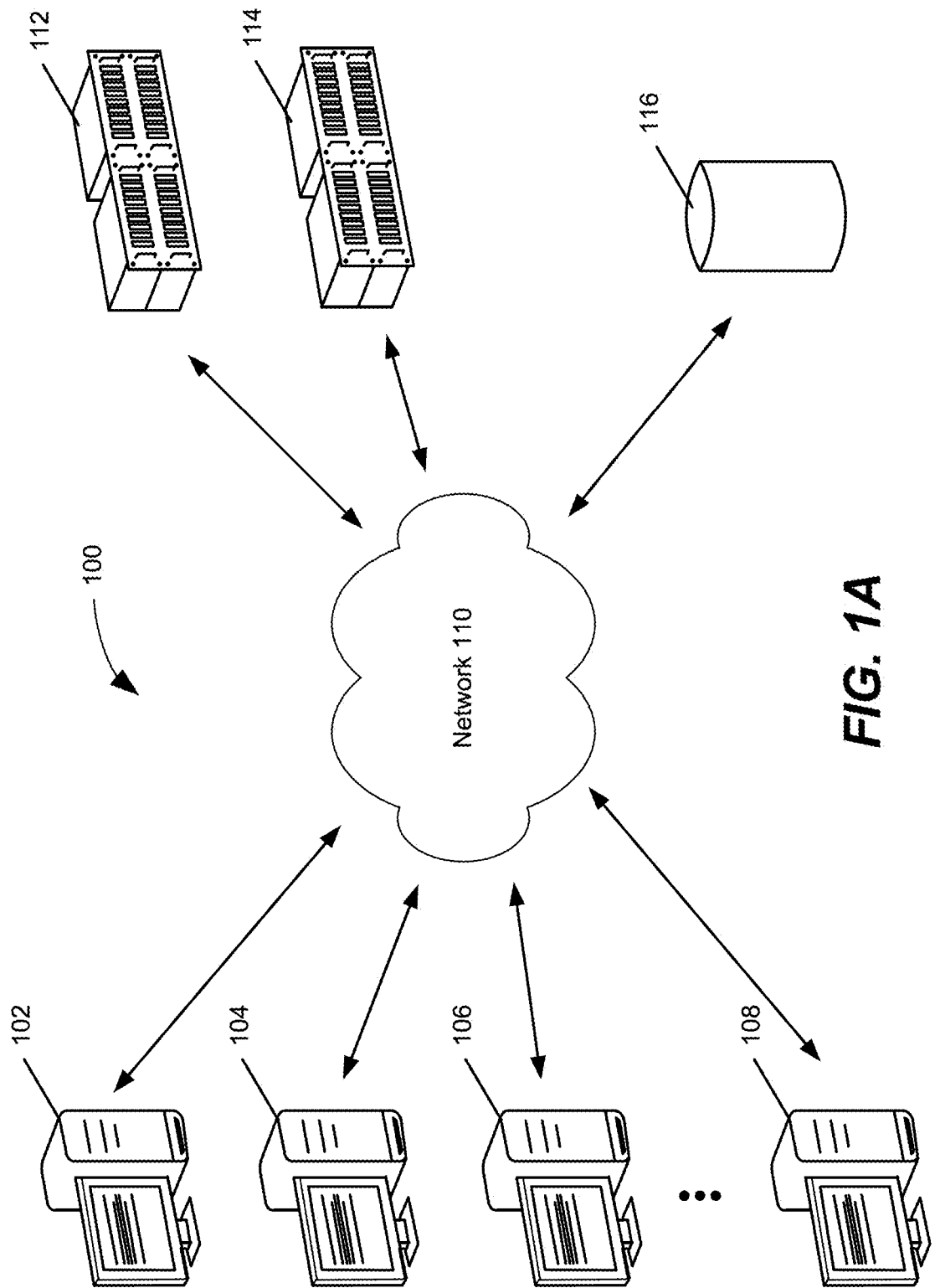

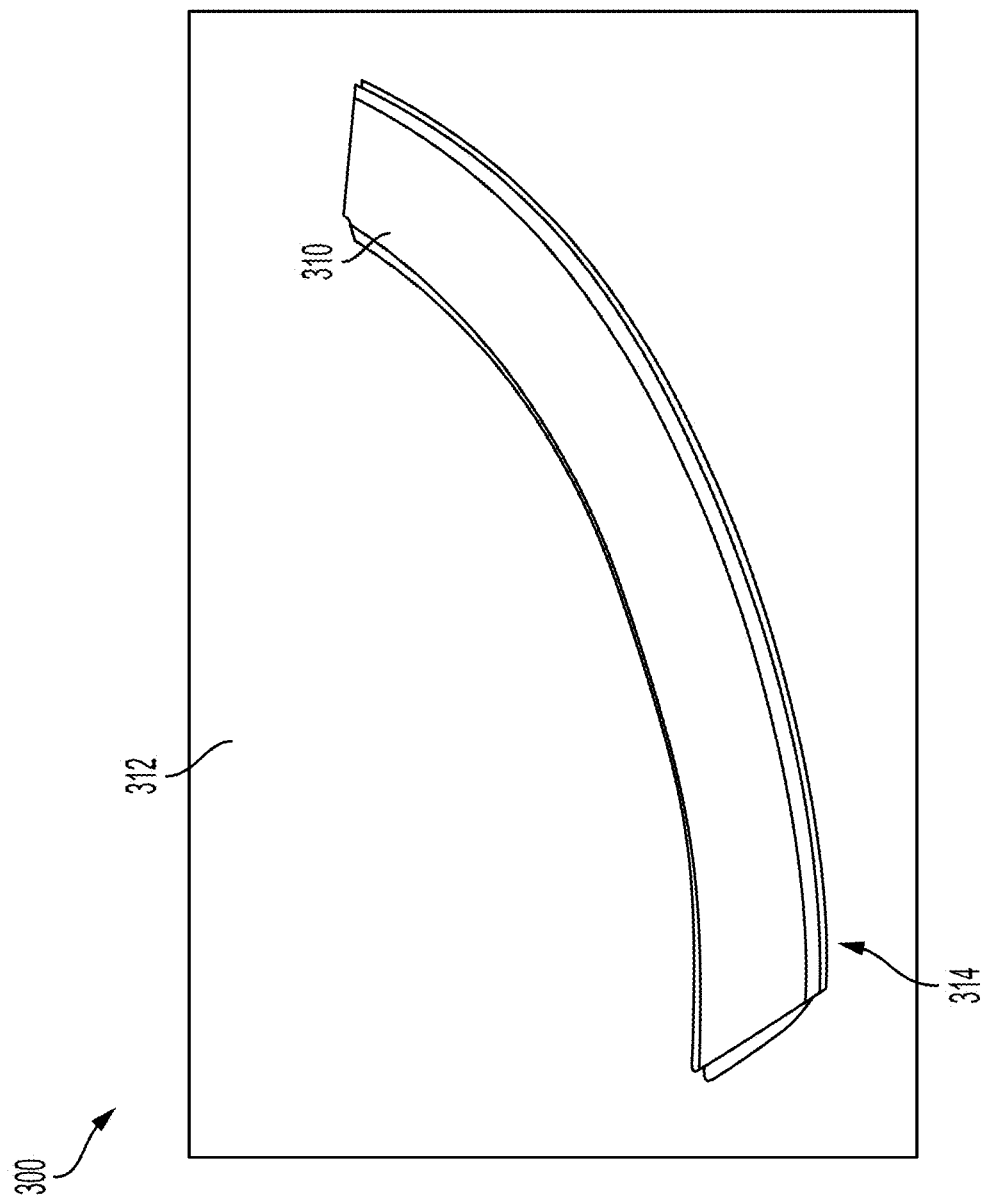

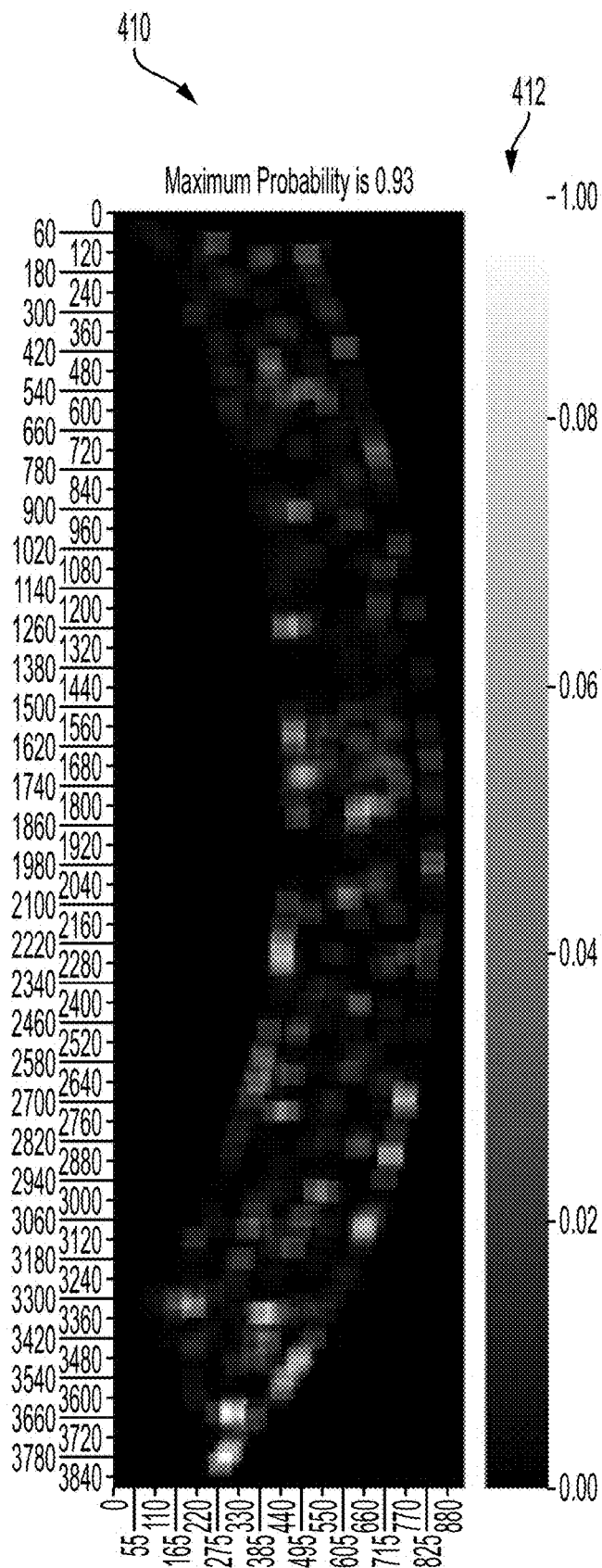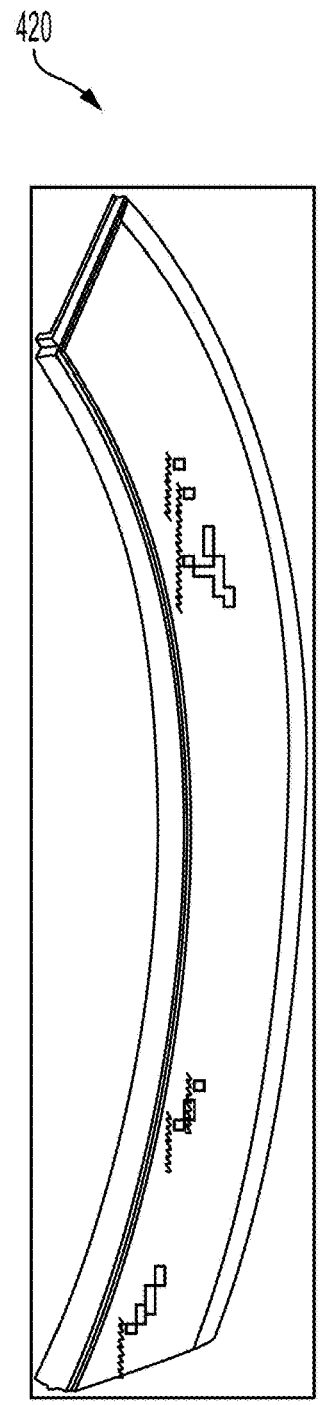
FIG. 4A                    FIG. 4B

AUTOMATED MACHINE VISION-BASED DEFECT DETECTION

CROSS-REFERENCE TO RELATED APPLICATIONS

This application is a continuation of U.S. patent application Ser. No. 18/064,040, entitled "AUTOMATED MACHINE VISION-BASED DEFECT DETECTION", filed Dec. 9, 2022 by Rajen Bhatt et al., which claims the benefit of U.S. patent application Ser. No. 17/110,131, entitled "AUTOMATED MACHINE VISION-BASED DEFECT DETECTION", filed Dec. 2, 2020 by Rajen Bhatt et al., which claims the benefit of U.S. Provisional Application No. 62/950,440, entitled "AUTOMATED MACHINE VISION-BASED DEFECT DETECTION", filed on Dec. 19, 2019. These applications are incorporated by reference herein in their entirety for all purposes.

TECHNICAL FIELD

The present disclosure relates generally to inspection of manufactured parts, and more specifically to automated machine vision-based detection of defects.

BACKGROUND

Identifying defects is an important component in many manufacturing processes. Quality checks in existing systems involve visual confirmation to ensure the parts are in the correct locations, have the right shape or color or texture, and are free from any blemishes such as scratches, pinholes, and foreign particles. However, human visual inspection may not be reliable due to limitations of human vision and human error. Additionally, the volume of inspections, product variety, and the possibility that defects may occur anywhere on the product and could be of any size may prove to be a heavy burden for inspectors. Therefore, there is a need for efficient systems and methods to replace human visual inspection of machine manufactured parts.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

In general, certain embodiments of the present disclosure describe systems and methods for automated machine vision-based defect detection. The method comprises operating in a training mode and in an inference mode. The method comprises training a neural network to detect defects. Training the neural network includes receiving a plurality of historical datasets including a plurality of training images corresponding to one or more known defects, converting each training image into a corresponding matrix representation, and inputting each corresponding matrix representation into the neural network to adjust weighted parameters based on the one or more known defects. The weighted parameters correspond to dimensions of the matrix representations. The method further comprises obtaining a test image of an object. The test image is not part of the historical dataset.

The method further comprises extracting portions of the test image as a plurality of input patches for input into the neural network, with each input patch corresponding to an extracted portion of the test image. The method further comprises inputting each input patch into the neural network as a respective matrix representation to automatically generate a probability score for each input patch using the weighted parameters. The probability score for each input patch indicates the probability that the input patch includes a predicted defect, and a defect score for the test image is generated based on the probability scores for each input patch. The defect score indicates a condition of the object.

The input patches may include a uniform height and a uniform width. The input patches may include overlapping portions of the test image. The input patches may be aligned such that each input patch is immediately adjacent to one or more other input patches of the plurality of input patches.

The neural network may comprise one or more of the following: a convolution layer, a max pooling layer, a flattening layer, and a fully connected layer. The neural network may be trained to accurately output probability scores for input patches with unknown defects using the weighted parameters. The method may further comprise generating a heat map of the input patches based on the probability scores. Prior to passing the test image into the neural network, the test image may be pre-processed to remove a background and represent the image in only a luma component of YCbCr format.

Other implementations of this disclosure include corresponding devices, systems, and computer programs configured to perform the described methods. These other implementations may each optionally include one or more of the following features. For instance, provided is a server system comprising an interface configured to receive a plurality of historical data sets including a plurality of images corresponding to one or more levels of known defects, and a test image of an object. The test image is not part of the historical dataset. The system further comprises memory configured to store the historical datasets and the test image.

The system further comprises a processor associated with a neural network. The configured for training a neural network to detect defects. Training the neural network includes converting each training image into a corresponding matrix representation, and inputting each corresponding matrix representation into the neural network to adjust weighted parameters based on the one or more known defects. The weighted parameters correspond to dimensions of the matrix representations.

The processor is further configured for extracting portions of the test image as a plurality of input patches for input into the neural network, with each input patch corresponding to an extracted portion of the test image. The processor is further configured for inputting each input patch into the neural network as a respective matrix representation to automatically generate a probability score for each input patch using the weighted parameters. The probability score for each input patch indicates the probability that the input patch includes a predicted defect, and a defect score for the test image is generated based on the probability scores for each input patch. The defect score indicates a condition of the object.

Also provided are one or more non-transitory computer readable media having one or more programs stored thereon for execution by a computer to perform the described methods and systems. These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 1A illustrates a diagram of an example network architecture for implementing various systems and methods of the present disclosure, in accordance with one or more embodiments.

FIGS. 3A and 3B illustrate displaying parts for inspection, in accordance with one or more embodiments.

FIGS. 4A and 4B illustrate example output resulting from automated inspection, in accordance with one or more embodiments.

DESCRIPTION OF PARTICULAR EMBODIMENTS

Figure 1B:
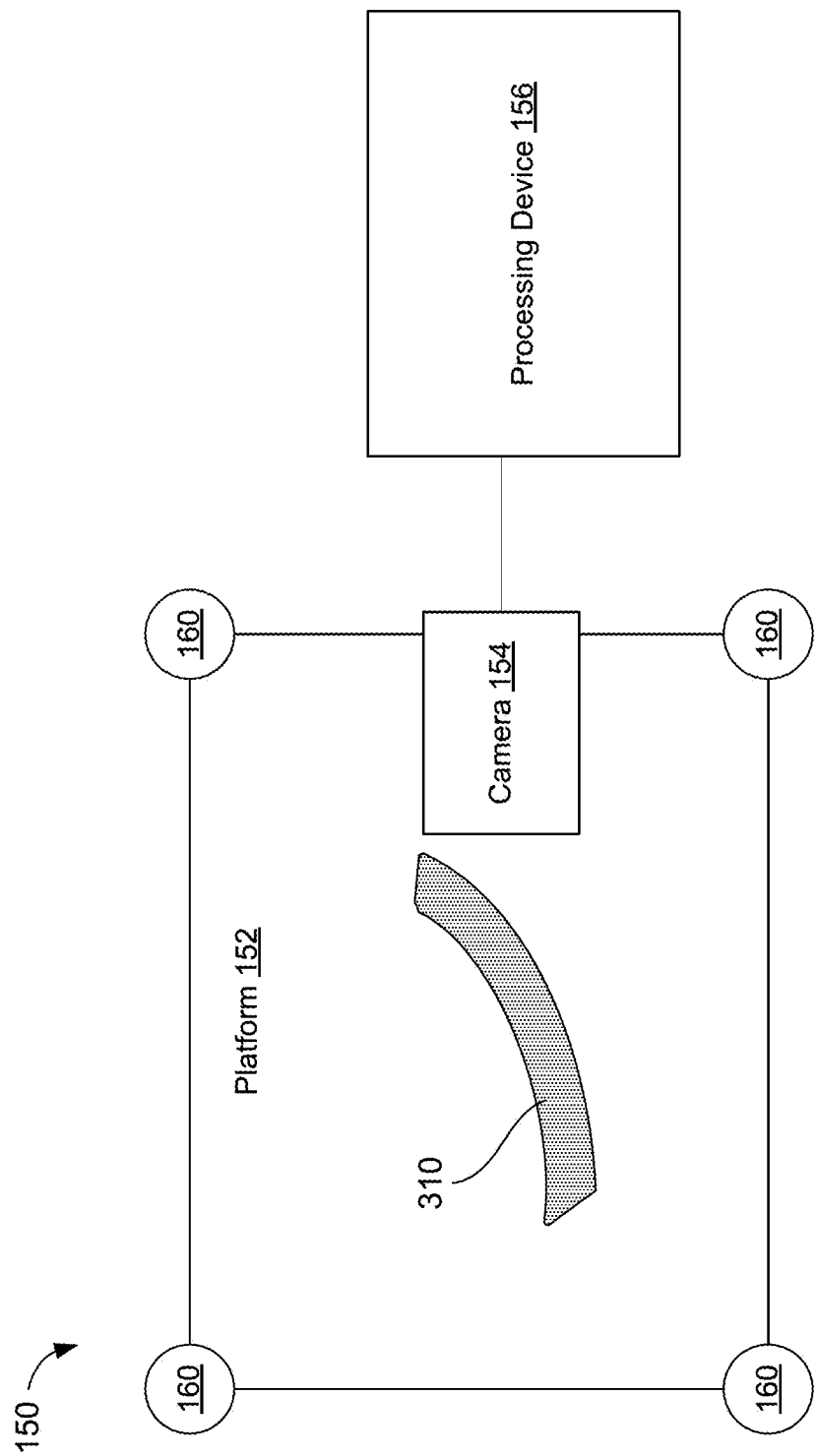
FIG. 1B illustrates an example imaging and processing system for automated inspection of manufactured parts, in accordance with one or more embodiments.

Reference will now be made in detail to some specific examples of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. Furthermore, the techniques and mechanisms of the present disclosure will sometimes describe a connection between two entities. It should be noted that a connection between two entities does not necessarily mean a direct, unimpeded connection, as a variety of other entities may reside between the two entities. Consequently, a connection does not necessarily mean a direct, unimpeded connection unless otherwise noted.

Overview

The general purpose of the present disclosure, which will be described subsequently in greater detail, is to provide a system and method for automated computer vision solutions to replace human visual inspection of machine-manufactured parts. Human visual inspection of parts generally takes about 30 seconds to 1 minute and always include a chance for human error. The described systems and associated methods may significantly reduce inspection time and provide increased accuracy in determining defective parts.

The described systems include light sources and high resolution imaging devices for capturing high resolution images of the machine-manufactured parts. The image is processed to remove background and other noise, align the image, and implement other image enhancements. Finally, the image is segmented into input patches for input into a computer vision-based model, or neural network, for analysis.

The neural network may comprise various computational layers, including at least one series of convolution and max pooling layers, a flattening layer, and one or more fully connected layers. The neural network is trained to accurately output a probability score for each input patch corresponding to the likelihood that the input patch includes an image of a defect. Such defects may be scratches, indents, or any other condition that does not meet quality standards for the part.

An overall defect score may then be generated for the entire image of the part based on the probability scores for each input patch. If the overall defect score is below a predetermined threshold, the part corresponding to the image may be classified as satisfactory. However, if the overall defect score is greater than a predetermined threshold, the part may be classified as defective. Defective parts may be removed from the assembly line. In some embodiments, defective parts may be discarded or repaired to meet quality standards.

Various output images may be generated and displayed at a user interface. For example, at heat map may be generated to indicate the probability scores for each input patch. As another example, outlines of the areas with detected defects may be overlaid onto the captured image to locate the defects.

Such imaging techniques may provide more accurate and precise analysis of parts compared to human visual inspection. By pre-processing images, surface features may be enhanced for visualization. The described techniques may also provide faster review of more parts in a given amount of time without reducing quality of the detection.

The defect detection process may be implemented at various points in the assembly line in order to reduce production costs or identify malfunctioning components along the assembly line. For example, defective parts may be identified and discarded by the described systems before additional machining or processing can be performed on such parts in order to avoid unnecessary production costs. As another example, the described techniques may pinpoint and identify issues with processing or manufacturing components if a high percentage of similar defects are found after particular points in the assembly line.

Other objectives and advantages of the present apparatus, systems, and methods will become obvious to the reader and it is intended that these objectives and advantages are within the scope of the present invention.

To the accomplishment of the above and related objectives, the disclosed apparatus, systems and methods may be embodied in the form illustrated in the accompanying drawings, attention being called to the fact, however, that the drawings are illustrative only, and that changes may be made in the specific construction illustrated.

DETAILED EMBODIMENTS

Turning now descriptively to the drawings, in which similar reference characters denote similar elements throughout the several views, the attached figures illustrate systems and methods for automated machine vision-based defect detection.

According to various embodiments of the present disclosure, FIG. 1A illustrates a diagram of an example network architecture 100 for implementing various systems and methods of the present disclosure, in accordance with one or more embodiments. The network architecture 100 includes a number of client devices (or "user devices") 102-108 communicably connected to one or more server systems 112 and 114 by a network 110. In some implementations, the network 110 may be a public communication network (e.g., the Internet, cellular data network, dial up modems over a telephone network) or a private communications network (e.g., private LAN, leased lines).

In some embodiments, server systems 112 and 114 include one or more processors and memory. The processors of server systems 112 and 114 execute computer instructions (e.g., network computer program code) stored in the memory to receive and process data received from the various client devices. In some embodiments, server system 112 is a content server configured to receive and store historical data sets, parameters, and other training information for a neural network. In some embodiments server system 114 is a dispatch server configured to transmit and/or route network data packets including network messages. In some embodiments, content server 110 and dispatch server 114 are configured as a single server system that is configured to perform the operations of both servers.

In some embodiments, the network architecture 100 may further include a database 116 communicably connected to client devices 102-108 and server systems 112 and 114 via network 110. In some embodiments, network data, or other information such as computer instructions, historical data sets, parameters, and other training information for a neural network may be stored in and/or retrieved from database 116.

Users of the client devices 102-108 access the server system 112 to participate in a network data exchange service. For example, the client devices 102-108 can execute web browser applications that can be used to access the network data exchange service. In another example, the client devices 102-108 can execute software applications that are specific to the network (e.g., networking data exchange "apps" running on devices, such as computers or smartphones).

Users interacting with the client devices 102-108 can participate in the network data exchange service provided by the server system 112 by distributing and retrieving digital content, such as text comments (e.g., updates, announcements, replies), digital images, videos, online orders, payment information, activity updates, location information, computer code and software, or other appropriate electronic information. In some embodiments, network architecture 100 may be a distributed, open information technology (IT) architecture configured for edge computing.

In some implementations, the client devices 102-108 can be computing devices such as laptop or desktop computers, smartphones, personal digital assistants, portable media players, tablet computers, cameras, or other appropriate computing devices that can be used to communicate through the network. In some implementations, the server system 112 or 114 can include one or more computing devices such as a computer server. In some implementations, the server system 112 or 114 can represent more than one computing device working together to perform the actions of a server computer (e.g., cloud computing). In some implementations, the network 110 can be a public communication network (e.g., the Internet, cellular data network, dial up modems over a telephone network) or a private communications network (e.g., private LAN, leased lines).

In various embodiments, the client devices and/or servers may be implemented as an imaging and image processing system. FIG. 1B illustrates such an example imaging and processing system 150 for automated inspection of manufactured parts, in accordance with one or more embodiments. In various embodiments, system 150 includes platform 152 with one or more light sources 160 positioned around the platform. Object 310 may be placed upon the surface of the platform. In some embodiments, the platform may be configured to secure object 310 in a desired position or orientation. Object-securing mechanisms may include fasteners, clamps, vacuum-based holders, etc. Although four light sources 160 are shown positioned at the corners of platform 152, various embodiments may include more or fewer light sources positioned in various other locations to provide the desired illumination of object 310. In some embodiments, the positions of light sources 160 may be configured to be changed to desired positions during operation to provide the desired lighting upon the object. Any suitable movement mechanism (such as motors, etc.) for positioning the light sources may be implemented.

System 150 may further include camera 154. In various embodiments, camera 154 is a high resolution camera configured to take high resolution still images of objects on the platform. The capture images may then be transmitted to processing device 156 which may apply image processing algorithms and implement computer vision-based models described herein to automatically detect defects on the object. As used herein, computer vision-based models may include neural networks.

In various embodiments, processing device 156 may be an edge computing device configured to locally process the images captured from camera 154 using computer vision models described herein. In some embodiments, processing device 156 is an embedded device in a client device (such as camera 154) that performs the image processing described herein. In some embodiments, the embedded device is a microcontroller unit (MCU) or other embedded processor or chip. In some embodiments, client devices 102-108 may function as processing device 156 to perform the image processing. In some embodiments, processing device 156 may be servers 112 and/or 114 that are implemented as local computers or servers on a private LAN to process the captured images. In some embodiments servers 112 and/or 114 may be implemented as a centralized data center providing updates and parameters for a neural network implemented by the processing device. Such edge computing configurations may allow for efficient data processing in that large amounts of data can be processed near the source, reducing Internet bandwidth usage. This both reduces costs and ensures that applications can be used effectively in remote locations. In addition, the ability to process data without ever putting it into a public cloud adds a useful layer of security for sensitive data.

Figure 2:
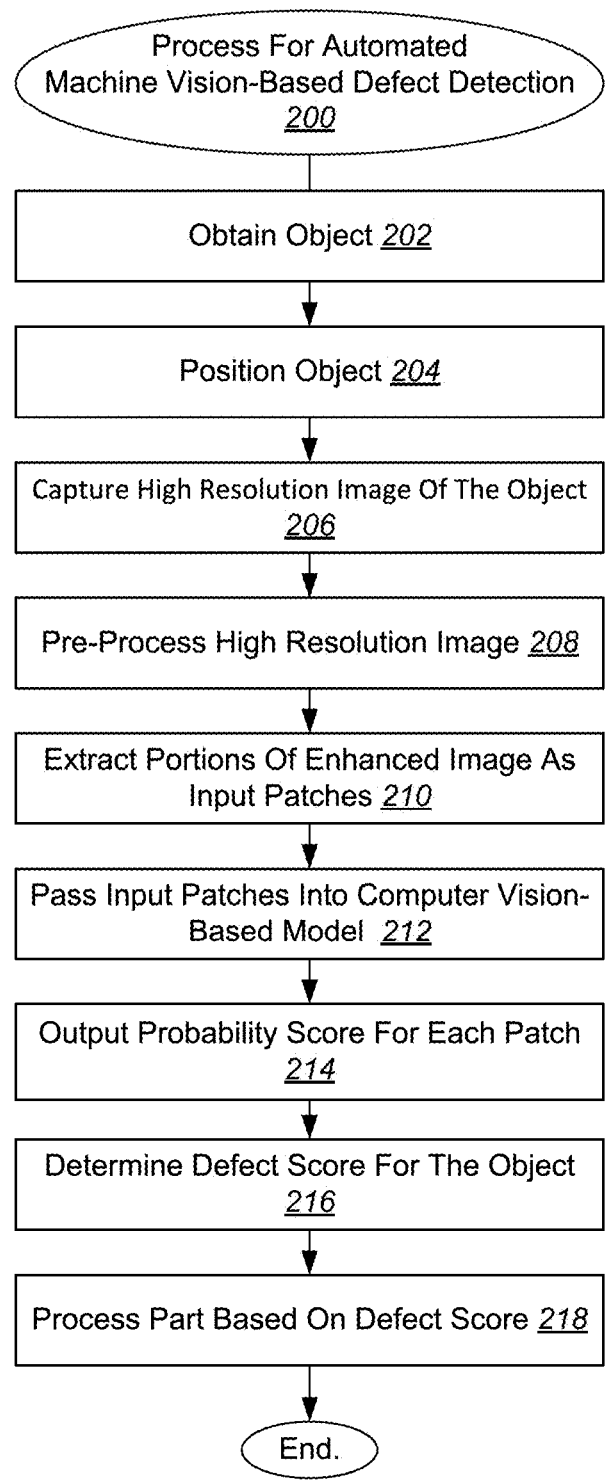
FIG. 2 illustrates a process flow chart for automated machine vision-based defect detection, in accordance with one or more embodiments.

FIG. 2 illustrates a process flow chart for automated machine vision-based defect detection, in accordance with one or more embodiments. At operation 202, an object is obtained for imaging. In particular embodiments, object 310 is a machine manufactured part. For example, object 310 may be a garnish for an automobile, such as molding trim.

At operation 204, the object is positioned into a desired orientation. For example, the part may be positioned and secured onto platform 152. In some embodiments, such parts may be machined by various automated processes and directly placed on the platform. In some embodiments, the platform may be integrated into the assembly line such that parts may be inspected at various times in the manufacturing process. For example, automotive garnish parts may have a scratch (or multiple scratches) which does not pass predetermined quality standards. Such defective parts may then be discarded or further processed to address the defects. Parts which do not indicate any scratches or defects are acceptable and can pass the quality standard for further processing.

Once positioned in the desired orientation on the platform, the object is exposed to sufficient lighting and still images are captured by camera 154, which may obtain high resolution images of the object at operation 206. For example, a capture image may include about 8 megabytes, or a resolution above about 1800×1200 pixels, or an effective resolution above about 300 pixels per inch. With reference to FIG. 3A, shown is a high resolution image 300 of object 310. As shown, image 300 includes object 310 along with background 312 and shadow 314.

At operation 208, the high resolution image is preprocessed to prepare the image for input into the described neural network. In some embodiments, the image may be pre-processed to sharpen the image to enhance fine details of the imaged object. In some embodiments, other pre-processing stages may include automatic alignment of the object, background removal, color removal, contrast enhancement, and other image quality enhancements.

Figure 3B:
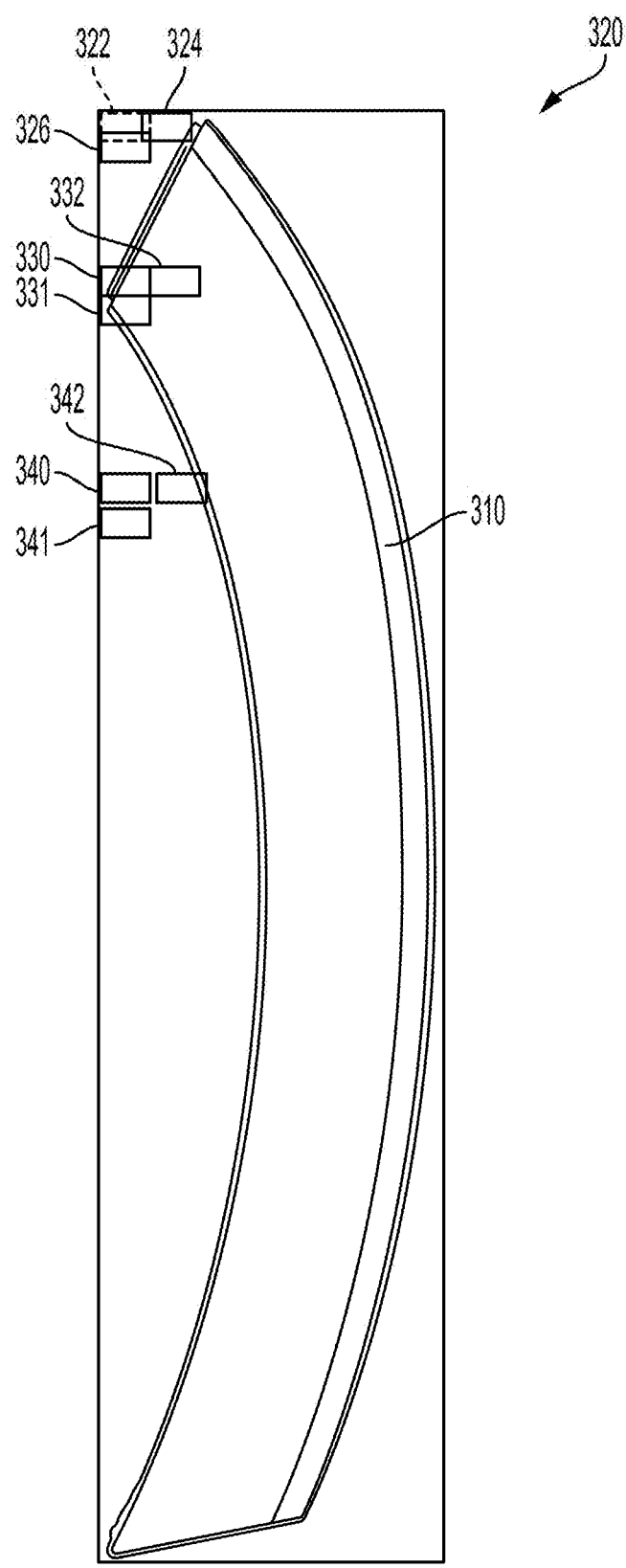

With reference to FIG. 3B, shown is an example of a pre-processed or enhanced image 320 of object 310, in accordance with one or more embodiments. Image 320 has been pre-processed to remove the background and increase contrast. Furthermore, image 320 is represented in only a single channel, specifically the Y component of YCbCr format. This color removal may enhance any surface defects that are present.

At operation 210, portions of the enhanced image are extracted as input patches. In various embodiments, the system extracts uniform portions of the pre-processed image that include the same pixel dimensions. For example, the input patches may each be 64 by 64 pixels in dimension. However, other sizes for the input patches may be determined by the configuration of the system. The input patches may be extracted as two dimensional segments of the image corresponding to the Y component. However, in some embodiments, the patches may include a third dimension if some color component or channel is included in the pre-processed image.

Several examples of input patches are shown in FIG. 3B. In some embodiments, the input patches include overlapping portions of the enhanced image. For example, patches 322, 324, and 326 include overlapping portions of image 320. Input patch 322 is shown outlined with a different line pattern for illustrative purposes. In such embodiments, each patch may overlap with neighboring patches by the same predetermined amount. By inputting overlapping images, portions of the object may be analyzed by the model more than once, thereby increasing the accuracy of the final defect score. However, by overlapping input patches, more input patches will be required to input the entire enhanced image through the neural network, thereby requiring additional processing time and resources.

As another example, input patches may exactly border adjacent patches. This allows the entire image to be fed into the neural network while minimizing the amount of necessary patches and therefore reduce the required processing time and resources. For example, patches 330, 331, and 332 are immediately adjacent to each other such that the pixels at the edge of adjacent patches are positioned immediately next to each other in image 320.

In yet other embodiments, extracted patches may be separated a number of pixels thereby further decreasing processing requirements, but at the expense of some accuracy due to the fact that not all portions of the object or enhanced image will be input into the neural network. For example, patches 340, 341, and 342 are separated by from each other by a set distance.

At operation 212, the input patches are passed into the described computer vision-based model, or neural network. In various embodiments, the input patches are input as pixel matrices. For example, the system may convert each patch into a matrix with dimensions equal to the pixel dimensions of the patch. Each pixel may be presented by one matrix element and assigned a value based on the shade of the pixel. For example, each matrix element may correspond to an integer from the set $\{0, 1, 2, \ldots 255\}$ where 0 corresponds to black and 255 corresponds to white. In described particular example, each input patch is 64×64 pixels. Such input patch would result in a matrix that is 64×64×1.

The input patches may then be fed into the neural network sequentially or in parallel based on the system architecture. As previously described, the system architecture may comprise a processing device implemented as an embedded target designed for specific control functions within a larger system, often with real-time computing constraints. Such embedded target may be embedded as part of a complete device often including hardware and mechanical parts. For example, the embedded target may be an embedded microcontroller unit (MCU) or embedded processor of the camera, which implements the neural network. In various embodiments, the neural network is stored in flash memory or other storage corresponding to the embedded target, or on other accessible memory of the camera. In other embodiments, the processing device may be implemented as a local or cloud-based server. In edge computing configurations, large amounts of data may be processed near the source, reducing Internet bandwidth usage, allowing for images to be input in parallel. However, where the processing device is implemented as a centralized cloud-based server, additional processing time and power may be required to transmit the images to the server for processing, requiring images to be input sequentially.

In some embodiments, only input patches containing portions of the object are input into the neural network. Various object recognition techniques may be implemented to identify input patches that do not include any part of the object, such as patches 340 and 341. This may reduce the overall processing requirements by preventing analysis of input patches that do not include any portion of the imaged object.

At operation 214 a probability score is output by the computer vision-based model for each input patch that is passed into the model. For example, a probability score between 0 and 1 may be determined for each input patch, which indicates the likelihood that the image in the input patch includes a defect. As such, a score of 0 would indicate no defect detected and a score of 1 would indicate a positive detection of a defect. In other words, a probability score of 1 means that the model is 100% confident of a defect shown in the input patch, whereas an output probability score of 0.87 means that the model is 87% confident of the presence of a defect.

In various embodiments, the model is trained to determine a probability score based on several factors. For example, the size and deepness of a scratch on the part, as represented by the image in the input patch, may affect the probability score. In various embodiments, the probability score may be visualized for review by a user. With reference to FIG. 4A, shown is an example heat map 410 of the input patches reflecting the determined probability scores. The axes of heat map 410 indicate that the image is approximately 3840×880 pixels.

The scale 412 included in FIG. 4A indicates that the probability scores are represented with shading from black (indicating a score of 0.00) to white (indicating a score of 1.00). In various embodiments, an area of image 410 corresponding to the input patch is shaded based on the predicted presence of a defect within that patch. Thus, the shaded patches indicate locations and severity of estimated defects on the part. The shaded patches in FIG. 4A are shown to overlap, indicating the overlapping portions of the extracted input patches At operation 216, an overall defect score is determined for the object. The overall defect score may be determined based on the probability scores for each of the input patches. In some embodiments, the overall defect score is the maximum value of the accumulated probability scores. For example, p(s1) identifies the probability of a defect for a first patch, p(s2) identifies the probability of a defect for a second patch, and so on up to p(sN) for the Nth patch. The overall defect score may be determined as max {p(s1), p(s2), . . . , p(sN)}. However, in some embodiments, the overall defect score may be determined based on other methods. For example, the overall defect score may be determined based on an average of the accumulated probability scores.

In some embodiments, a part is determined to be unacceptably defective if the overall defect score is above a predetermined threshold. For example, a part with an overall defect score greater than 0.90 may be deemed to be unacceptably defective. Referring back to the example of FIG. 4A, the maximum of the probability scores is 0.93, thus the overall defect score is 0.93.

With reference to FIG. 4B, shown is an example image 420 produced by the described systems, in accordance with one or more embodiments. Image 420 depicts a part with outlined areas corresponding to defects detected by the model. In some embodiments, the outlined areas may correspond to the portions of the image included in the input patches with a probability score above a predetermined threshold. For example, the outlined areas may correspond to input patches with assigned probability scores greater than 0.90.

Figure 5:
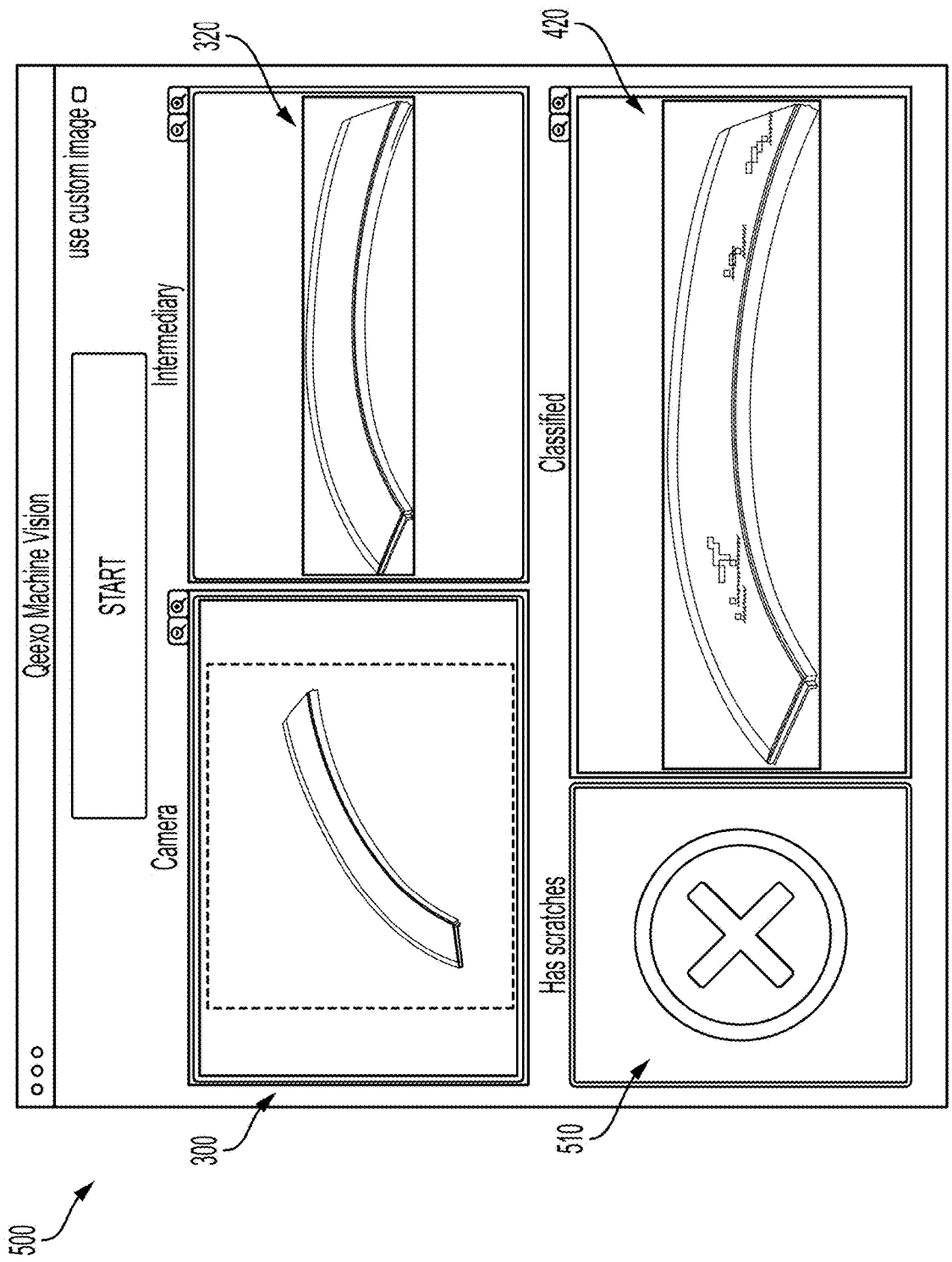
FIG. 5 illustrates an example user interface displaying processed and inspected parts, in accordance with one or more embodiments.

One or more of the various images previously described may be displayed at a user interface. With reference to FIG. 5, shown is an example user interface 500 displaying processed and inspected images, in accordance with one or more embodiments. Images 300, 320, and 420 are displayed at user interface 500. This may allow a user of the system to visually review the analysis performed by the model. In some embodiments, a quality control status 510 may be displayed indicating the acceptability of the part. In some embodiments, the overall defect score may also be shown.

At operation 218, the object may be further processed based on the determined defect score. In some embodiments, the described methods of defect detection may be performed after the machining to analyze the final output part. Parts found to be acceptable (such as those with defect scores at or below 0.90) may be transferred for packaging or shipment. However, the described models may be implemented at various points in the assembly line, and at multiple points in the assembly line.

In some embodiments, the part may be repaired to correct the defects. For example, the part may be automatically transferred to another area of the assembly line to correct the defects found. As another example, a defective part may be disposed of. In some embodiments, defective parts may be re-machined or recycled to form new parts. Implementing the computer vision-based model at various points can identify defective parts before further manufacturing is performed on the defective parts, saving resources, materials, and costs. The quick automatic defect detection provided by the model may also be used at various points during the manufacturing process in order to manage the performance of particular components of the assembly line and pinpoint potential issues. For example, if a high percentage of parts are found to be defective after point B in an assembly line, but the same parts are acceptable after a previous point A, then it may suggest an issue with the machining tools beginning at point B.

Figure 6:
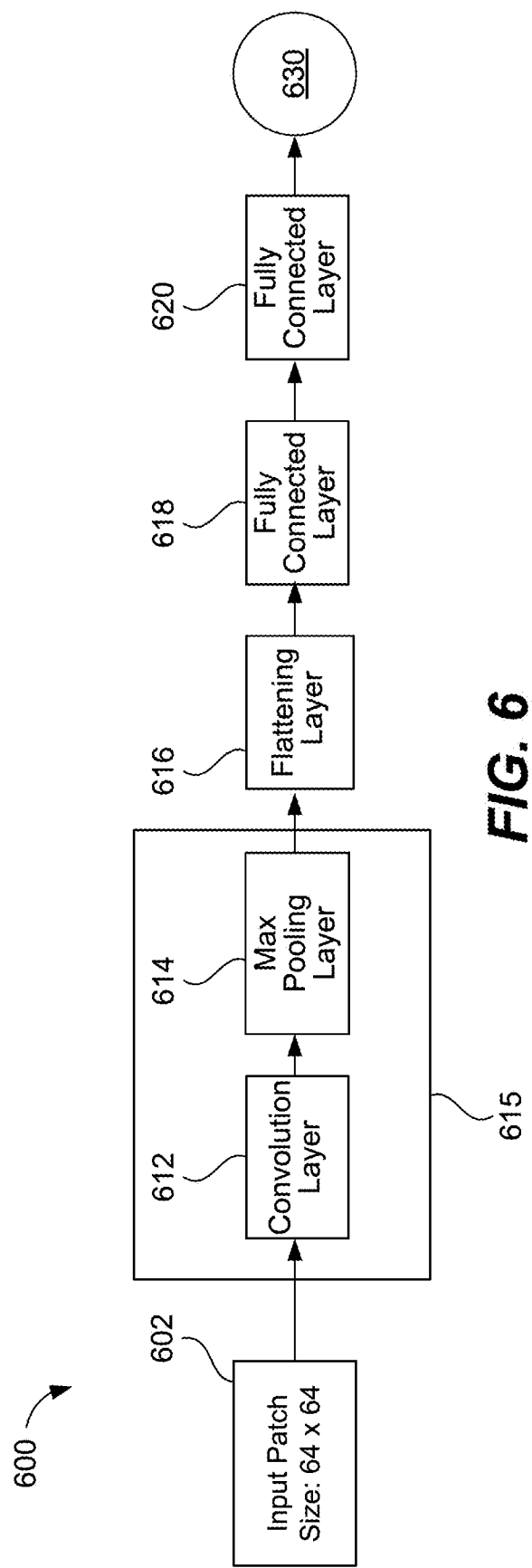
FIG. 6 illustrates an example neural network architecture implemented to automatically detect defects, in accordance with one or more embodiments.

The computer vision-based model may be a neural network with various computational layers. With reference to FIG. 6, shown is an example neural network architecture 600 implemented to automatically detect defects, in accordance with one or more embodiments. As shown, neural network 600 includes convolution layer 612, max pooling layer 614, flattening layer 616, fully connected layer 618, and fully connected layer 620.

An input patch 602 may be input into the convolution layer 612. In various embodiments, the input patch 602 may be an extracted portion of an image, such as input patch 330. In some embodiments, input patch 602 may be a portion of an image with an unknown defect status. In some embodiments, the input patch 602 may be a training image with a known corresponding defect. For example, a training image may include a corresponding probability score of 0 (indicating no defects) or 1 (indicating a defect).

In various embodiments, convolution layer 612 applies a filter, K, of particular dimensions to the pixel matrix of the input patch. For example, the filter may include the dimensions of 3×3×1. In some embodiments, the filter is applied with a stride length of 8. The convolution operation extracts high-level features from the input patch. The convolution layer outputs a convolved matrix. The convolution layer may apply same padding or valid padding to the matrix to output the convolved matrix.

The convolved matrix output is then fed into the max pooling layer 614. In various embodiments, the max pooling layer performs max pooling of the convolved matrix by returning the maximum value from the portion of the convolved matrix covered by the max pooling kernel. For example, the pool size may be 2×2×1. In some embodiments, the neural network may apply an average pooling function instead of max pooling, which returns the average of all the values from the portion of the convolved matrix covered by the max pooling kernel. In an example, the output of the max pooling layer may be a matrix of 64 units (a 64×64 matrix).

As such, the pooling layer may reduce the spatial size of the convolved feature in order to decrease the computational power required to process the data through dimensionality reduction, as well as to extract dominant features for maintaining the process of training the model. In some embodiments, the neural network may include a series of consecutive convolution and max pooling layers. For example, neural network 600 may include three consecutive convolution-pooling pairs 615 in which the output of the max pooling layer is fed as input into the convolution layer of a subsequent convolution-pooling pair. The convolution and max pooling layers may implement a truncated normal distribution for initialization and a rectified activation function. As such, each convolution-pooling pair 615 may take a matrix of 64 units as input and output a matrix of 64 units.

The neural network may include any number of consecutive convolution-pooling pairs based on available processing resources and desired performance. Implementation of three consecutive convolution-pooling pairs may minimize the latency of the image processing while maintaining a desired level of accuracy in prediction. For example, using three convolution-pooling pairs in the neural network may allow each input patch of a test image to be fully analyzed to determine a defect score for the object within approximately 5 seconds. The use of a stride length of 8 may further optimize the accuracy and latency of the image processing (or runtime) based on the number of placements of the filter used on each input patch. As such, the inference process may be highly optimized to run from mobile devices or constrained embedded devices.

The output of the final max pooling layer is then fed into flattening layer 616 to flatten the output into a column vector. The column vector output is then fed into fully connected layers 618 and 620. In various embodiments, the fully connected layers may be a multi-layer perceptron (a feed-forward neural network). In some embodiments, the first fully connected layer 618 implements a rectified linear unit (ReLU) as an activation function. In an example embodiment, the first fully connected layer 618 may comprise 128 neurons. However, a greater or a fewer number of neurons may be implemented in different embodiments. In some embodiments, the second fully connected layer 620 implements a sigmoid activation function. In some embodiments, the fully connected layers may implement a truncated normal distribution for initialization.

During a training mode, neural network 600 may be configured to produce probabilities that a particular input patch includes a defect. In various embodiments, output 630 may be set to a probability score of 1 if the training image includes a known defect, or to a probability score of 0 if the training image does not include any defect. With the known probability score, the weights (or parameters) in the fully connected layers may be updated using backpropagation. For example, the parameters may be updated via a stochastic gradient descent algorithm with an Adam optimization algorithm. In some embodiments, this may be achieved by converting activation values of output layer neurons to probabilities using a softmax function.

In some embodiments, the training of the neural network may be performed at a centralized server system in a global or cloud network. In some embodiments, the training data, such as weights, parameters, and training images may be stored at the centralized server system. The updated weights may then be transmitted from the centralized server system to a local edge computing device for more efficient image processing. As previously described, the local edge computing device may be an embedded target, such as an MCU or an embedded processor, of the client device, such as camera 154. In some embodiments, the parameters of the neural network may be periodically updated at the centralized server based on new training data. However, in some embodiments, training of the neural network may be performed at the local edge computing device.

In some embodiments, the neural network is sufficiently trained once a predetermined number of training images have been input into the model. In some embodiments, the neural network is sufficiently trained once it is able to generate predictions with a desired accuracy rate.

Once fully trained, the neural network may then operate in an inference mode to take an input patch with unknown defect characteristics as input 602. The neural network then passes the input through the described layers and generates an output 630 for the input patch between 0 and 1 based on the updated weights to indicate the probability that the input patch includes a defect.

Figure 7A:
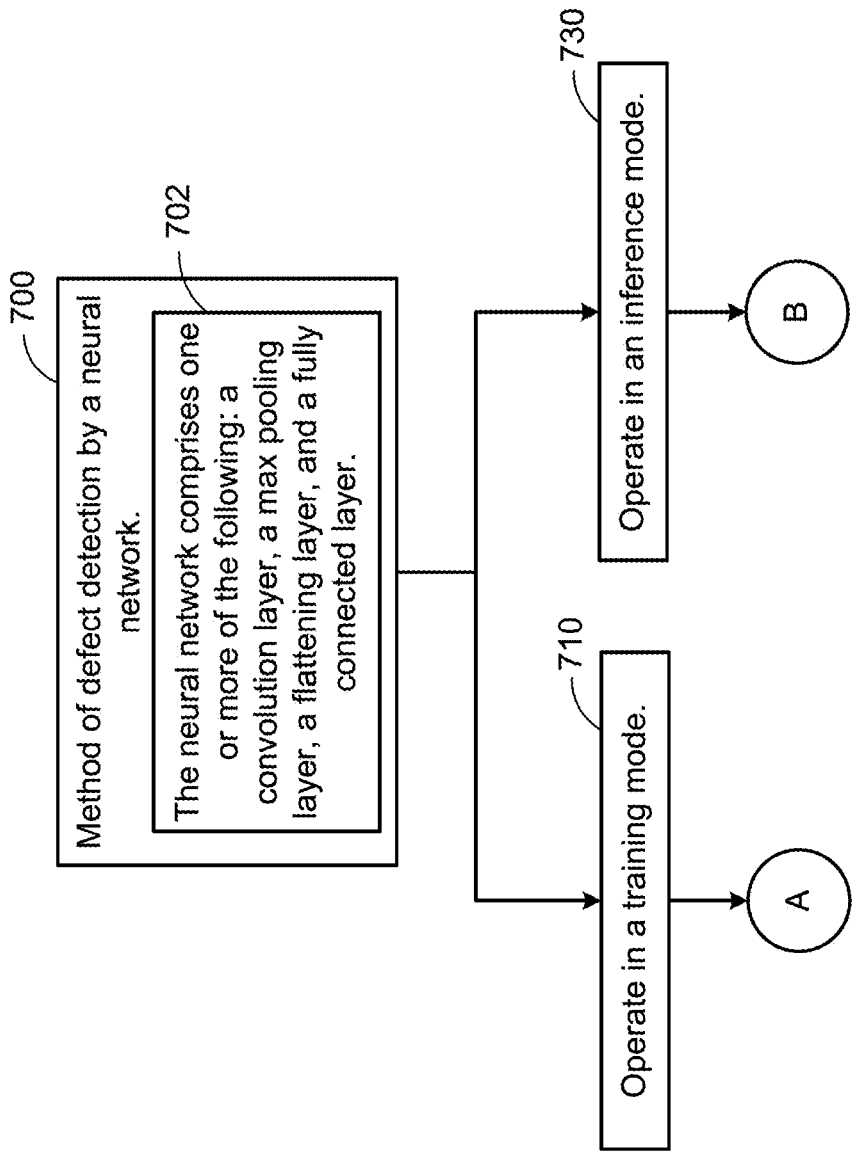
FIGS. 7A, 7B, and 7C illustrate an example method for automated machine vision-based defect detection, in accordance with one or more embodiments.
Figure 7B:
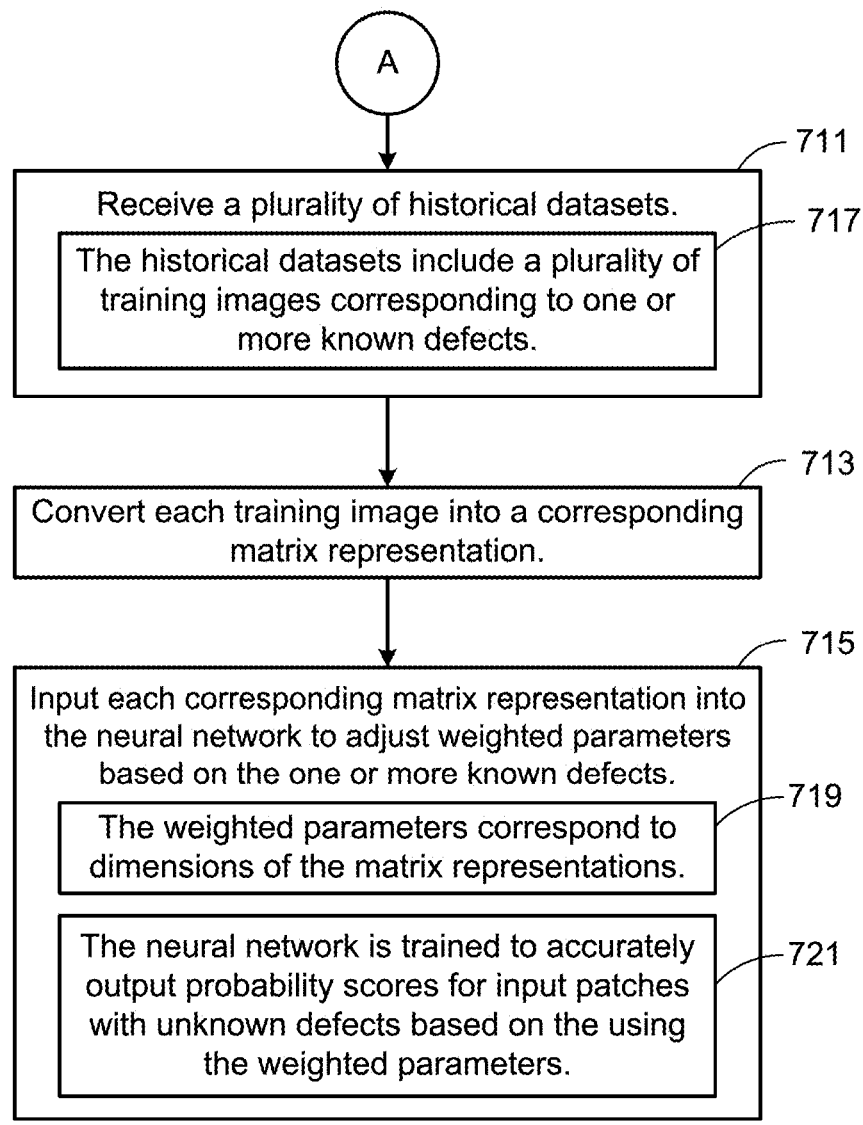
Figure 7C:
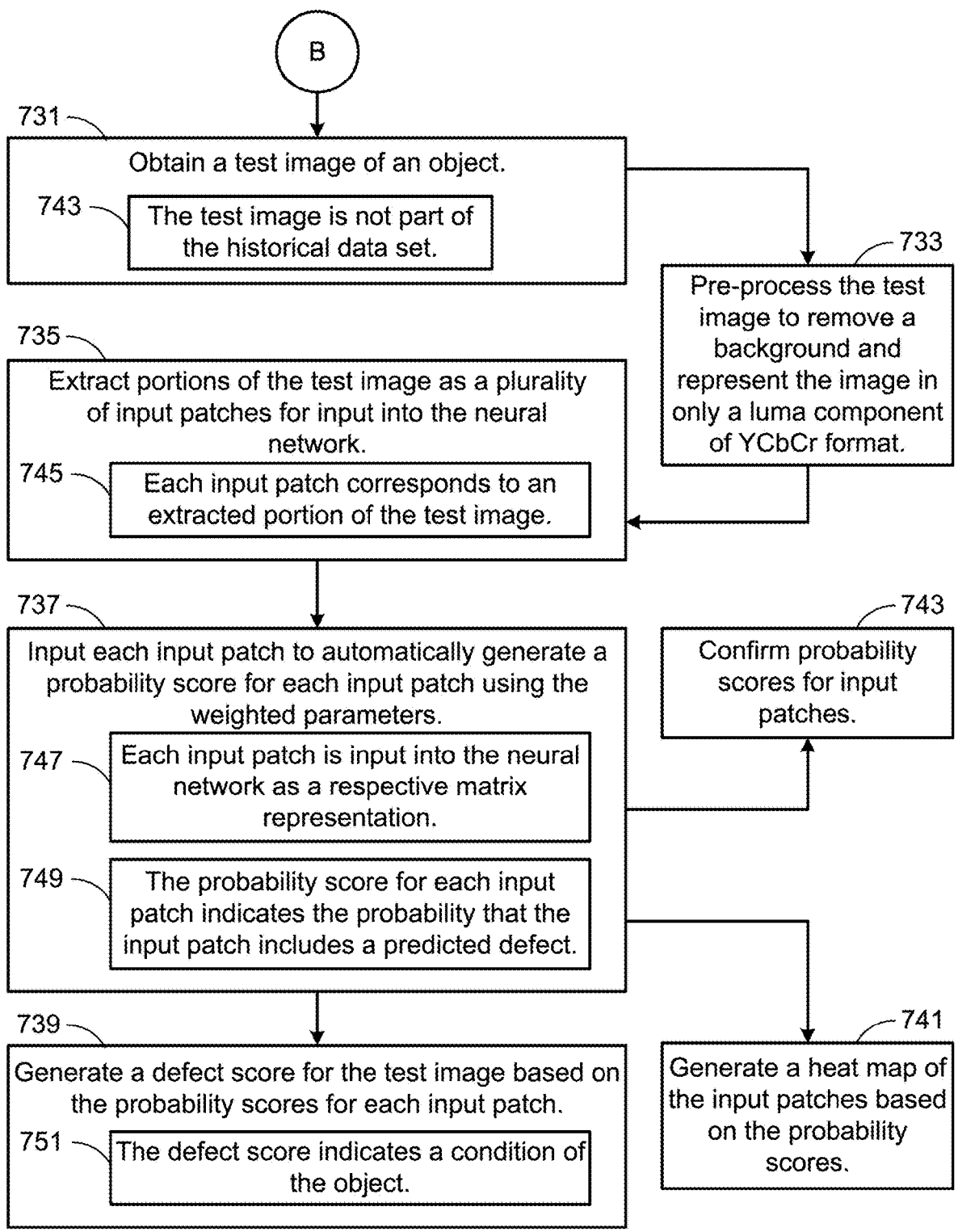

With reference to FIGS. 7A, 7B, and 7C, shown is an example method 700 for training and operating a neural network to computer vision-based defect detection. The neural network may be neural network 600 and may comprise one or more computational layers 702. As previously discussed, may comprise one or more of the following layers: a convolution layer, a max pooling layer, a flattening layer, and a fully connected layer. FIG. 7B illustrates an example of operations of the neural network in a training mode 710, and FIG. 7C illustrates an example of operations of the neural network in an inference mode 730, in accordance with one or more embodiments.

In the training mode, the neural network is trained to detect defects using datasets of training images. When operating in the training mode 710, a plurality of historical datasets is received at operation 711. The historical datasets may include a plurality of training images 717 corresponding to one or more known defects. In some embodiments, the training images may represent or correspond to input patches extracted from images of one or more objects. In some embodiments, the training images may include corresponding values indicating whether the training image includes a defect on the corresponding portion of the object. For example, the training image may be associated with a probability score of 1 if the training image shows a relevant defect, or a probability score of 0 if the training image does not show a relevant defect. Such values may be stored in the image file of the training images, such as in metadata as an example.

At operation 713, each training image is converted into a corresponding matrix representation. As previously described, the matrix representation may correspond to the pixel dimensions of the training image. For example, the training image may be 64×64 pixels and represented in only one color channel (luma). As such, the dimension of the corresponding matrix may be 64×64×1.

At operation 715, each corresponding matrix representation is input into the neural network to adjust weighted parameters 719 in the various layers of the neural network based on the one or more known defects. In some embodiments, the weighted parameters 719 may correspond to dimensions of the matrix representations. The known probability scores may be input into the neural network along with the matrix representation to generate and update parameters in the fully connected layers of the neural network. As such, the neural network may be trained (721) to accurately output probability scores for input patches with unknown defects using the weighted parameters 719.

In some embodiments, the predictive merchant association model may be determined to be sufficiently trained once a desired error rate is achieved. For example, a desired error rate may be 0.00001% (or an accuracy rate of 99.9999%). In other embodiments, the model may be determined to be sufficiently trained after a set number of epochs or iterations, such as after a predetermined number of training images have been input into the model. For example, the model may be sufficiently trained when 1000 training images have been input into the neural network along with known probability scores. Once sufficiently trained, the neural network may be implemented to detect defects in new images in the inference mode 730.

When operating in the inference mode 730, a test image 743 of an object, such as object 310, is obtained at operation 731. The test image 743 is not part of the historical dataset and may include a part with unknown possible defects. For example test image 743 may be obtained of a part during the manufacturing process at one of various different points on the assembly line. The test image may then be pre-processed at operation 733 before input into the neural network for analysis. In some embodiments, the test image is pre-processed to remove the background from the image of the part. In some embodiments, the test image is pre-processed to represent the image in only a luma component of YCbCr format. Various other image pre-processing techniques may be implemented on the test image, as previously discussed with reference to operation 208.

At operation 735, portions of the test image are extracted as a plurality of input patches 745 for input into the neural network. For example, the input patches may be any one of the input patches described with reference to FIG. 3B. Each input patch 745 may correspond to an extracted portion of the test image. The pixel dimensions of the input patches may be the same as the training images.

At operation 737, each input patch is input into the neural network to automatically generate a probability score 749 for each input patch 745 using the weighted parameters 719. Each input patch 745 may be input into the neural network as a respective matrix representation 747, similar to the training images 717. As described, the input patches may be input into the neural network in series or in parallel. The probability score 749 for each input patch indicates the probability that the input patch includes a predicted defect.

Once probability scores have been determined for input patches corresponding to every portion of the test image, a defect score 751 is generated for the test image based on the probability scores for each input patch at operation 739. The defect score 751 may indicate a condition of the object. In some embodiments, the defect score may be the maximum of the determined probability scores 749. For example, a defect score above a predetermined threshold may be determined to be unfit for sale or use. As another example, the defect score may be an average of the probability scores.

Parts with defect scores above a predetermined threshold may be disposed of so that they are not used. In some embodiments, defective parts may be further processed to repair or remove the identified defects. The analysis of the images may be visualized for review by a user of the system.

For example, a heat map of the input patches, such as heat map 410, may be generated based on the probability scores at operation 741. Other output images may be generated such as image 420. These output images may be displayed at a user interface, such as interface 500, such that a user of the system may view the detected defects. This may allow a user to locate defects in order to remove or repair them.

In some embodiments, the predicted defects within the test images or corresponding input patches may be confirmed at operation 743 and used to further train and fine tune the neural network. For example, the probability scores may be confirmed by a user at a user interface displaying the input patch image and corresponding probability score. The user may then confirm whether the image, or particular patches, shows a defect. If the user confirms that a defect is present, the associated probability score for the input patch may be set at 1. If the user confirms that no defect is present, the associated probability score for the input patch may be changed to 0.

The input patches selected for confirmation at operation 743 may be randomly selected from one or more different test images obtained during the inference mode. However, in some embodiments, input patches with a probability score within a predetermined range may be selected for confirmation. For example, input patches receiving a probability score between 0.4 and 0.6 may be selected for confirmation. These images may correspond to instances where the neural network is unable to identify a defect with sufficient certainty.

Once input patches have been confirmed, they may be input into the neural network during the training mode to refine the weighted parameters of the neural network. For example, the method may return to operation 713 or 715 to convert and input a confirmed input patch as a training image with the confirmed probability score. In some embodiments, the processed input patches are transmitted back to retrain the neural network in regular batch sizes, which may include a predetermined number of processed input patches, such as 100 input patches. For example, a batch of confirmed input patches may comprise a historical dataset that is received at operation 711. This improves the network performance over the time and as it sees more examples.

Figure 8:
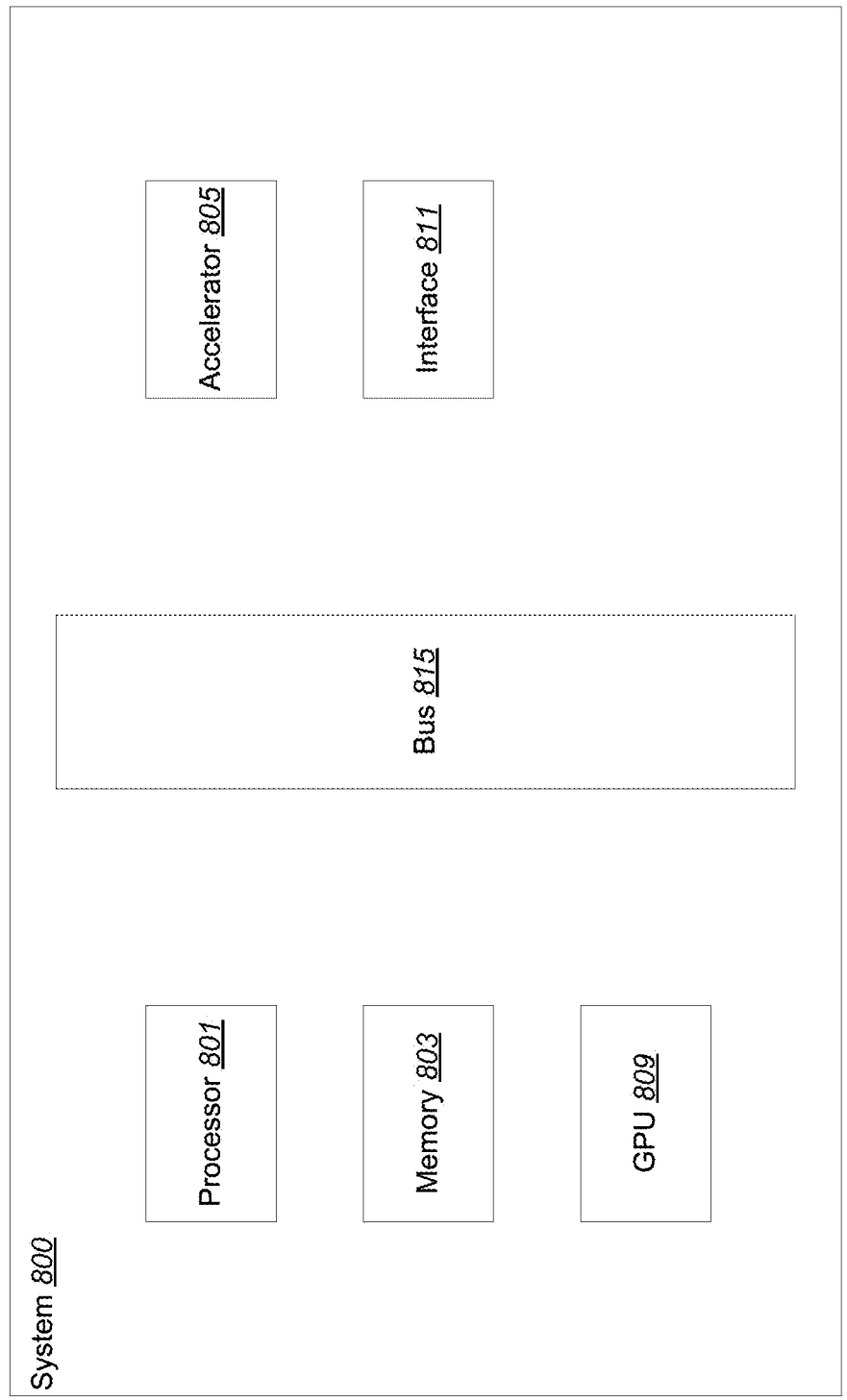
FIG. 8 illustrates a particular example of a computer system that can be used with various embodiments of the present disclosure.

With reference to FIG. 8, shown is a particular example of a computer system that can be used to implement particular examples of the present disclosure. For instance, the computer system 800 may represent a client device, server, or other edge computing device according to various embodiments described above. According to particular example embodiments, a system 800 suitable for implementing particular embodiments of the present disclosure includes a processor 801, a memory 803, an accelerator 805, an interface 811, and a bus 815 (e.g., a PCI bus or other interconnection fabric). When acting under the control of appropriate software or firmware, the processor 801 is responsible for training and implementing described computer models and neural networks. The processor may also be responsible for controlling operational functions of a camera, and transmitting data over a network between client devices and a server system. Various specially configured devices can also be used in place of a processor 801 or in addition to processor 801. The complete implementation can also be done in custom hardware.

The interface 811 may include separate input and output interfaces, or may be a unified interface supporting both operations. When acting under the control of appropriate software or firmware, the processor 801 is responsible for such tasks such as implementation of a neural network or computer vision-based model. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like. Generally, these interfaces may include ports appropriate for communication with the appropriate media. In some cases, they may also include an independent processor and, in some instances, volatile RAM. The independent processors may control such communications intensive tasks as packet switching, media control and management.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

In some embodiments, system 800 further comprises a graphics processing unit (GPU) 809. As described above, the GPU 809 may be implemented to process each pixel on a separate thread. In some embodiments, system 800 further comprises an accelerator 805. In various embodiments, accelerator 805 is a rendering accelerator chip, which may be separate from the graphics processing unit. Accelerator 805 may be configured to speed up the processing for the overall system 800 by processing pixels in parallel to prevent overloading of the system 800. For example, in certain instances, ultra-high-definition images may be processed, which include many pixels, such as DCI 4K or UHD-1 resolution. In such instances, excess pixels may be more than can be processed on a standard GPU processor, such as GPU 809. In some embodiments, accelerator 805 may only be utilized when high system loads are anticipated or detected.

In some embodiments, accelerator 805 may be a hardware accelerator in a separate unit from the CPU, such as processor 801. Accelerator 805 may enable automatic parallelization capabilities in order to utilize multiple processors simultaneously in a shared memory multiprocessor machine. The core of accelerator 805 architecture may be a hybrid design employing fixed-function units where the operations are very well defined and programmable units where flexibility is needed. In various embodiments, accelerator 805 may be configured to accommodate higher performance and extensions in APIs, particularly OpenGL 2 and DX9.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method comprising:
   obtaining a test image of an object;
   pre-processing the test image to generate a plurality of regions of the test image for subsequent processing steps;
   segmenting portions of the test image into a plurality of patches for input into a neural network that was trained using a historical dataset that does not include the test image, each patch of the plurality of patches corresponding to a segmented portion of the test image;
   determining whether each patch of the plurality of patches is within a region of the plurality of regions of the test image; and
   inputting each patch of the plurality of patches that is determined to be within a region of the plurality of regions into the neural network as a respective matrix representation, while excluding patches of the plurality of patches that are determined to not be within the region of the plurality of regions from the neural network.

2. The method of claim 1, wherein the neural network is embedded in a camera device.

3. The method of claim 1, wherein patches in the plurality of patches are input into the neural network in parallel.

4. The method of claim 1, wherein patches in the plurality of patches include overlapping portions of the test image.

5. The method of claim 1, wherein patches in the plurality of patches are aligned such that each patch is immediately adjacent to one or more other patches of the plurality of patches.

6. The method of claim 1, wherein the neural network is configured to accurately output a probability score for a defect in each patch input into the neural network using weighted parameters.

7. The method of claim 6, further comprising generating a heat map of the patches based on the probability scores of the patches.

8. A system comprising:
a processor; and
memory, the memory storing instructions to execute a method, the method comprising:
obtaining a test image of an object;
pre-processing the test image to generate a plurality of regions of the test image for subsequent processing steps;
segmenting portions of the test image into a plurality of patches for input into a neural network that was trained using a historical dataset that does not include the test image, each patch of the plurality of patches corresponding to a segmented portion of the test image;
determining whether each patch of the plurality of patches is within a region of the plurality of regions of the test image; and
inputting each patch of the plurality of patches that is determined to be within a region of the plurality of regions into the neural network as a respective matrix representation, while excluding patches of the plurality of patches that are determined to not be within the region of the plurality of regions from the neural network.

9. The system of claim 8, wherein the neural network is embedded in a camera device.

10. The system of claim 8, wherein patches in the plurality of patches are input into the neural network in parallel.

11. The system of claim 8, wherein patches in the plurality of patches include overlapping portions of the test image.

12. The system of claim 8, wherein patches in the plurality of patches are aligned such that each patch is immediately adjacent to one or more other patches of the plurality of patches.

13. The system of claim 8, wherein the neural network is configured to accurately output a probability score for a defect in each patch input into the neural network using weighted parameters.

14. The system of claim 13, further comprising generating a heat map of the patches based on the probability scores of the patches.

15. A non-transitory computer readable medium storing instructions to cause a processor to execute a method, the method comprising:
obtaining a test image of an object;
pre-processing the test image to generate a plurality of regions of the test image for subsequent processing steps;
segmenting portions of the test image into a plurality of patches for input into a neural network that was trained using a historical dataset that does not include the test image, each patch of the plurality of patches corresponding to a segmented portion of the test image;
determining whether each patch of the plurality of patches is within a region of the plurality of regions of the test image; and
inputting each patch of the plurality of patches that is determined to be within a region of the plurality of regions into the neural network as a respective matrix representation, while excluding patches of the plurality of patches that are determined to not be within the region of the plurality of regions from the neural network.

16. The non-transitory computer readable medium of claim 15, wherein the neural network is embedded in a camera device.

17. The non-transitory computer readable medium of claim 15, wherein patches in the plurality of patches are input into the neural network in parallel.

18. The non-transitory computer readable medium of claim 15, wherein patches in the plurality of patches include overlapping portions of the test image.

19. The non-transitory computer readable medium of claim 15, wherein patches in the plurality of patches are aligned such that each patch is immediately adjacent to one or more other patches of the plurality of patches.

20. The non-transitory computer readable medium of claim 15, wherein the neural network is configured to accurately output a probability score for a defect in each patch input into the neural network using weighted parameters.

* * * * *